(12) United States Patent
Murray et al.

(10) Patent No.: US 7,007,048 B1
(45) Date of Patent: Feb. 28, 2006

(54) SYSTEM FOR INFORMATION LIFE CYCLE MANAGEMENT MODEL FOR DATA MIGRATION AND REPLICATION

(75) Inventors: Thomas J. Murray, Longmont, CO (US); William C. Farnum, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 452 days.

(21) Appl. No.: 10/447,553

(22) Filed: May 29, 2003

(51) Int. Cl.
*G06F 12/00* (2006.01)

(52) U.S. Cl. .......................... 707/204; 707/1; 707/100; 707/104.1; 707/102

(58) Field of Classification Search ...................... None
See application file for complete search history.

(56) References Cited

U.S. PATENT DOCUMENTS 5,379,423 A    1/1995 Mutoh et al.

*Primary Examiner*—Charles Rones
*Assistant Examiner*—Belix M. Ortiz
(74) *Attorney, Agent, or Firm*—Brooks Kushman P.C.

(57) ABSTRACT

The invention provides a system for information lifecycle management of storage data on a storage network architecture. The system provides for bi-directional data transfer between an information lifecycle management controller, a host file system storage area network and an information lifecycle management storage area network. The information lifecycle management controller helps manage the data storage file transfers between the subsystems of the host file system storage area network and information lifecycle management storage area network. The method provides an information lifecycle management shim program, which resides in the host computer of the host file system storage area network, for hostless information lifecycle management of the data storage files. The system further provides a user-defined information lifecycle management of the migration, replication, copying, and backing up of the storage data files.

25 Claims, 3 Drawing Sheets

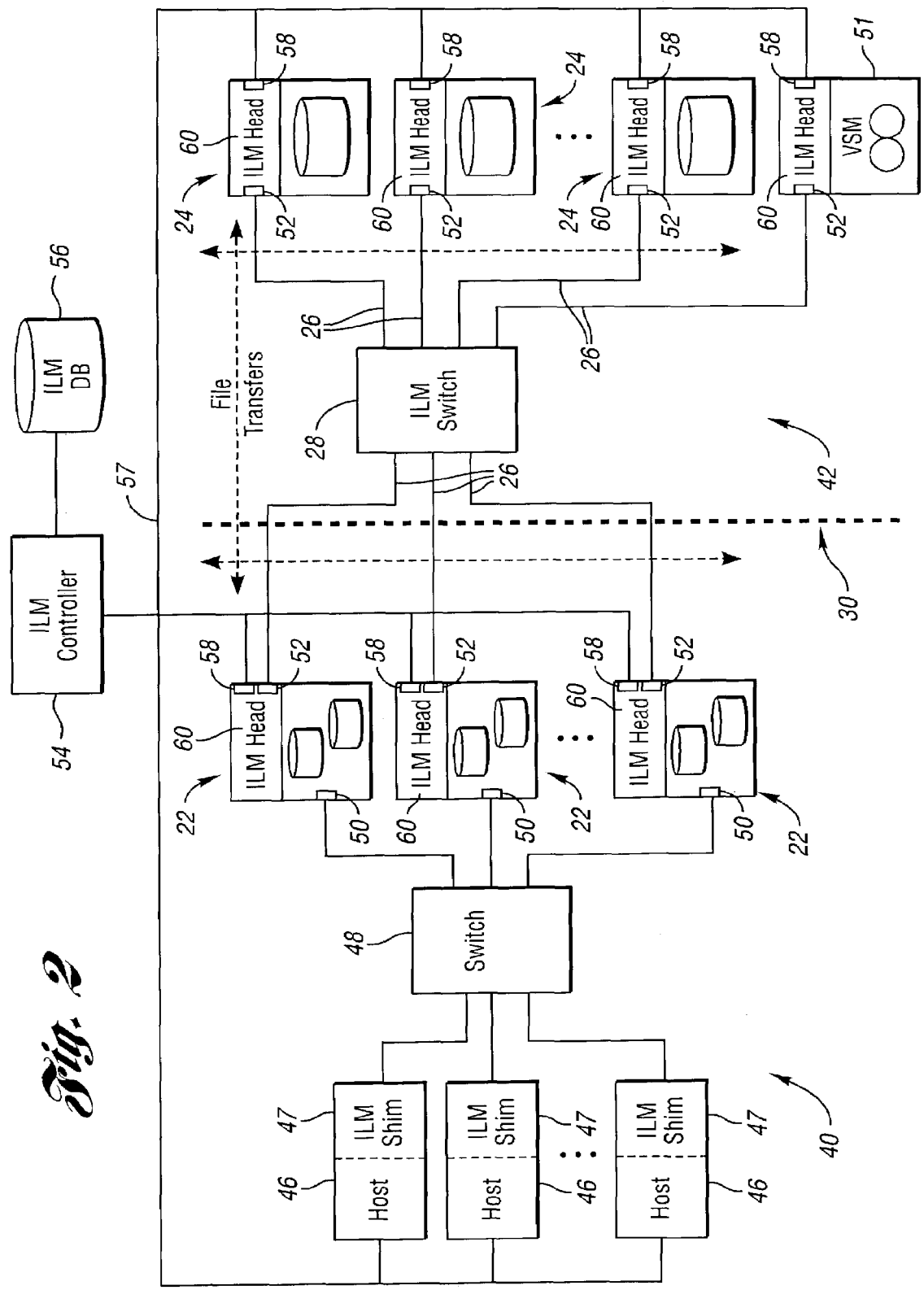

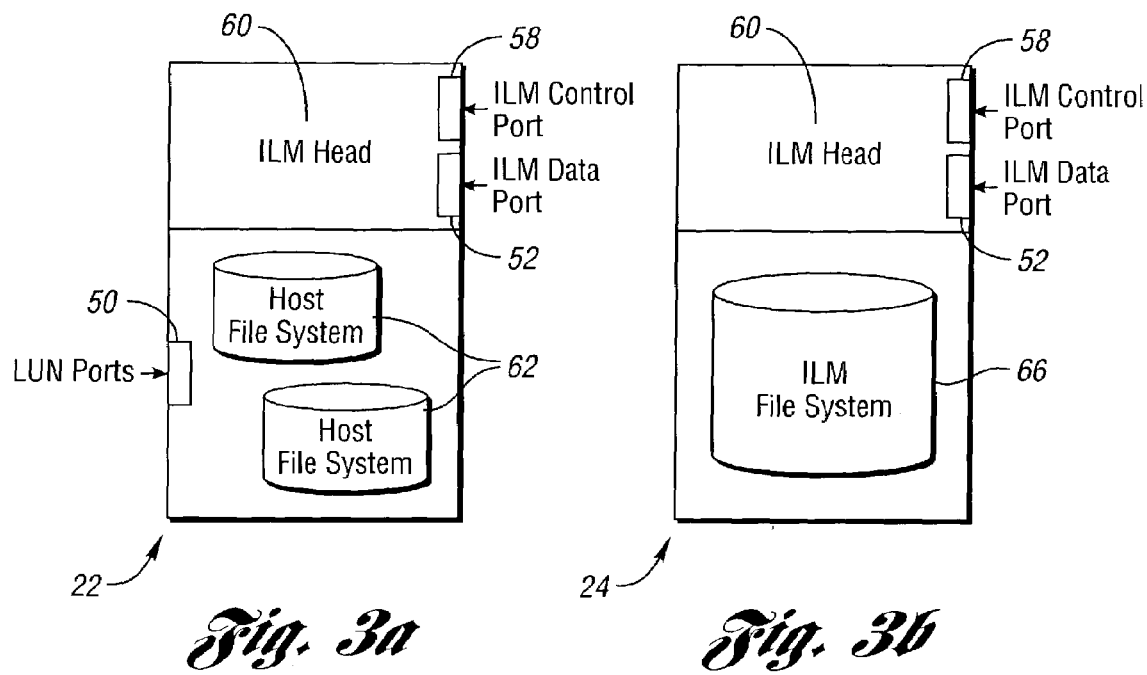
*Fig. 3a*  *Fig. 3b*
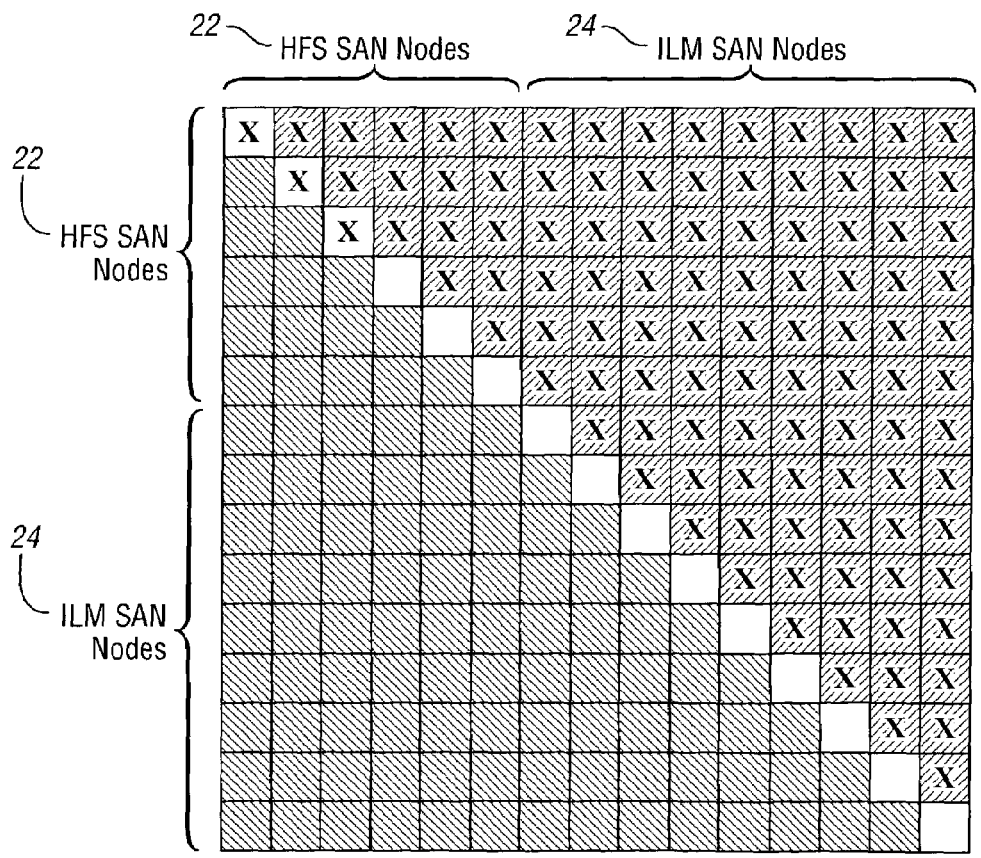
*Fig. 4*

SYSTEM FOR INFORMATION LIFE CYCLE MANAGEMENT MODEL FOR DATA MIGRATION AND REPLICATION

BACKGROUND OF THE INVENTION

1. Field of the Invention

The present invention relates to a system for information life cycle data storage management in a tiered storage area network.

2. Background Art

The storage area network (SAN) has become a necessity for virtually every sector of commerce where there is a requirement for storing data with high capacity, high speed, and increased reliability. SANs offers businesses a reduction in information technology costs in the management of storage data. SANs perform operations such as disk mirroring, data backup, data restoration, data archival, data retrieval, data migration between storage devices, and data sharing.

Typically, SANs interconnect data storage devices with respective user host computers that are usually configured as file servers; this configuration is called a host file system (HFS) SAN. HFS SANs use application software code to run on these host server computers to manage data storage. The software code resides and runs on the customer's host server which manages and migrates the data. However, when the software code resides and runs on the host computer server, it decreases the efficiency and capability of the host computer server.

Persistent storage device mediums come in different tiers or echelons of performance. High performance storage devices, like magnetic disk drives, are the most expensive and fastest. However, when large amounts of storage data that is rarely accessed and used is maintained on these top level storage devices, it can drastically waste the storage capacity and performance of the storage device and thus is not cost effective. Lower end performance storage devices, like tape drives, offer great capacity for storage at less cost, but offer slow performance speeds. Ideally, storage data that is rarely accessed and used would be stored on the lower end performance storage devices. Therefore, storage data that is accessed often and would require greater speed and reliability should reside on higher end storage devices like magnetic disk drives.

Thus there exists a need for a SAN data storage architecture that imposes minimal execution burden on customer hosts for file system metadata and event acquisition. The SAN management application code does not reside or run on the customer host server and can be kept outside of the customer host server to optimize the host computer server performance.

Furthermore, there also exists a need for uniform information lifecycle management of user files spanning a disparate collection of file systems. The user desires the ability to manage data outside of the host computer with greater uniformity, flexibility and precision using lifecycle management of information.

Effective management of the tiers of storage devices is desired for maximum optimization of the storage devices. These tiers of storage can be managed more efficiently with an information lifecycle management method and system. Savings can be realized when using the storage devices to run at optimum efficiency.

SUMMARY OF THE INVENTION

According to the present invention, a tiered information lifecycle management system interconnects a host file system (HFS) storage area network (SAN), an information lifecycle management (ILM) SAN, an ILM controller, and an ILM database (DB). The ILM controller controls hostless data transfer between the HFS SAN and the ILM SAN. The ILM controller further controls hostless data transfer between the HFS SAN and the ILM SAN in accordance with storage policies. The ILM DB is operable with the ILM controller for tracking data storage information of the data stored in the HFS SAN and the ILM SAN.

The HFS SAN of the present invention includes the interconnection of a switch, a host computer, and a HFS SAN subsystem. The switch may be a fibre channel switch or the like. The host computer and the HFS SAN subsystem are connected to the ILM controller with a bi-directional communication network link. The HFS SAN subsystem consists of a logical unit number (LUN) port, a host file system, and an ILM head having an ILM control port and an ILM data port.

In another aspect of the invention, the connection between the HFS SAN subsystem and the ILM controller is between the ILM controller and the ILM control port of the ILM head. The connection between the HFS SAN subsystem and the switch is between the switch and the LUN port of the HFS SAN subsystem.

In another aspect of the invention, the ILM SAN includes the interconnection of an ILM switch and an ILM head. The ILM switch is connected to an ILM data port of the HFS SAN subsystem and an ILM data port of an ILM SAN subsystem with a bi-directional communication network link. The ILM SAN subsystem includes an ILM file system and an ILM head having an ILM control port and an ILM data port.

In another aspect of the invention, the connection between the ILM SAN subsystem and the ILM controller is between the ILM controller and the ILM control port of the ILM SAN subsystem. The connection between the ILM SAN subsystem and the ILM switch is between the ILM switch and the ILM data port of the ILM SAN subsystem.

In another aspect of the invention, the host computer may include a plurality of host computers. The HFS SAN subsystem may include a plurality of HFS SAN subsystems. The ILM SAN subsystem may include a plurality of ILM SAN subsystems. The HFS SAN subsystem includes a plurality of host file systems, and a plurality of logical unit number (LUN) ports.

In another aspect of the invention, the host computer includes an ILM shim program, which is operable for monitoring all data storage activities in the HFS SAN. The ILM shim program is operable for communicating with the ILM controller of any data storage activity occurring in the HFS SAN.

In another aspect of the invention, the ILM controller is operable with the ILM shim program for tracking the location of storage data on the HFS SAN subsystem which was written by the host computer. The ILM controller hostlessly transfers the stored data on the HFS SAN subsystem to the ILM SAN subsystem according to storage policies associated with the stored data. The ILM controller is operable with the ILM shim program for identifying a request by the host computer for the stored data from the HFS SAN subsystem. When in response to the request, the ILM controller hostlessly transfers the stored data from the ILM SAN subsystem to the HFS SAN subsystem for access by the host computer.

According to another aspect of the invention, a tiered information lifecycle management system includes a host file system (HFS) storage area network (SAN), an ILM shim program, an information lifecycle management (ILM) SAN connected to the HFS SAN, an ILM controller, and an ILM database (DB) connected to the ILM controller.

The HFS SAN includes a switch connected to a plurality of host computers and a plurality of HFS SAN subsystems. The ILM SAN includes an ILM switch connected to the plurality of HFS SAN subsystems and a plurality of ILM SAN subsystems.

The ILM controller is connected to the plurality of host computers, the plurality of ILM SAN subsystems, and the plurality of HFS SAN subsystems. The ILM controller controls hostless data transfer between the HFS SAN and the ILM SAN for data storage in accordance with storage policies.

The ILM DB is operable with the ILM controller for tracking information of storage files stored in the HFS SAN subsystems and the ILM SAN subsystems.

According to yet another aspect of the present invention, a tiered information lifecycle management system operable for hostless data transfer includes a host file system (HFS) storage area network (SAN), an information lifecycle management (ILM) SAN connected to the HFS SAN, an ILM controller connected to the ILM SAN and the HFS SAN, and an ILM database (DB) connected to the ILM controller.

The HFS SAN includes a host computer with an ILM shim program operable for monitoring data activities in the HFS SAN and a plurality of HFS SAN subsystems. The ILM SAN includes a plurality of ILM SAN subsystems.

The ILM controller controls hostless data transfer between the HFS SAN and the ILM SAN. The ILM controller further controlling hostless data transfer between the HFS SAN and the ILM SAN for data storage in accordance with storage policies when notified by the ILM shim program of data activities.

The ILM DB is operable with the ILM controller to catalog data storage information of data stored in the HFS SAN subsystems and the ILM SAN subsystems.

In another aspect of the invention, the ILM controller recognizes a migration command for a data storage file based on a storage policy. The ILM controller obtains information, regarding stored location in a source HFS SAN subsystem of the data storage file, from the ILM shim program. The ILM controller selects a sink ILM SAN subsystem for the data storage file to be migrated according to the storage policy. The source HFS SAN subsystem communicates the migration command with the sink ILM SAN subsystem. The ILM controller commands the source HFS SAN subsystem to transfer the data storage file to be migrated to the sink ILM SAN subsystem. The ILM controller of the sink ILM SAN subsystem notifies the ILM controller of completed data storage file transfer. The ILM DB stores information regarding the migration of the data storage file.

In another aspect of the invention, the ILM controller recognizes a recall command for a data storage file from the ILM shim program based on a storage policy. The ILM controller obtains information, regarding stored location in the source ILM SAN subsystem of the data storage file, from the ILM DB. The ILM controller selects a sink HFS SAN subsystem for the data storage file to be recalled according to the storage policy. The source ILM SAN subsystem, where the storage file to be recalled is stored, communicates the recall command with the sink HFS SAN subsystem. The ILM controller commands the source ILM SAN subsystem, where the data storage file to be recalled is stored, to transfer the data storage file to be recalled to the sink HFS SAN subsystem. The ILM control port of the sink HFS SAN subsystem notifies the ILM controller of completed data storage file transfer. The ILM controller notifies the ILM shim that the storage data file transfer is complete and to proceed with the file recall. The ILM shim then notifies the host computer to access the recalled data storage file.

In another aspect of the invention, the ILM controller recognizes a replication command for a data storage file based on a storage policy. The ILM controller obtains information, regarding the stored location in either the source HFS SAN subsystem or the source ILM SAN subsystem of the data storage file to be replicated, from the ILM shim or the ILM DB. The ILM controller selects either a sink HFS SAN subsystem or a sink ILM SAN subsystem for the data storage file to be replicated according to the storage policy. If the data storage file to be replicated will be stored on a sink HFS SAN subsystem, the ILM controller requests the ILM shim to prepare the host file system to receive the file to be replicated. The ILM controller commands the source HFS SAN subsystem or the source ILM SAN subsystem, where the data storage file to be replicated is stored, to copy the data storage file to be replicated to the sink HFS SAN subsystem or the sink ILM SAN subsystem according to the storage policy. The sink HFS SAN subsystem or the sink ILM SAN subsystem notifies the ILM controller of a completed storage data file copy. The ILM DB then stores the information regarding the replication of the storage data file.

In another aspect of the invention, the ILM controller recognizes a move command for a data storage file based on a storage policy. The ILM controller obtains information from the ILM DB or ILM shim program regarding the stored location of the data storage file to be moved based on the storage policy. The ILM controller selects either a sink HFS SAN subsystem or a sink ILM SAN subsystem for the data storage file to be moved according to the storage policy. If the data storage file to be moved will be stored on a sink HFS SAN subsystem, the ILM controller requests the ILM shim to prepare the host file system to receive the file to be moved. The ILM controller commands the source HFS SAN subsystem or the source ILM SAN subsystem, where the storage data file is stored, to transfer the data storage file to the sink HFS SAN subsystem or the sink ILM SAN subsystem according to the storage policy. The sink HFS SAN or the sink ILM SAN subsystem notifies the ILM controller of completed data storage file move. The ILM DB stores information regarding the movement of the data storage file.

In another aspect of the invention, the ILM controller recognizes a promotion command for a data storage file from the ILM shim program of one of the plurality of host computers based on a storage policy. The ILM controller obtains information regarding the stored location in the ILM SAN subsystem of the data storage file to be promoted from the ILM DB. The ILM controller requests the ILM shim to prepare the host file system to receive the file to be promoted. The ILM controller commands the ILM SAN subsystem, where the data storage file to be promoted is stored, to transfer the data storage file to the HFS SAN subsystem for the host computer based on the storage policy. The ILM controller notifies the ILM shim program of completed promotion of the data storage file. The ILM shim program then notifies the host computer to access the promoted data storage file.

In yet another aspect of the invention, the ILM controller performs hostless back up of storage data files in the plurality of HFS SAN subsystems to the plurality of ILM SAN subsystems as defined by the storage policy.

The ILM shim program also recognizes copy-on-X event commands for a data storage file according to a copy-on-X event storage policy. The ILM shim notifies the ILM controller of the copy-on-X event command for a data storage file. The ILM controller copies the data storage file to the one of the plurality of HFS SAN subsystems or one of the plurality of ILM SAN subsystems according to the copy-on-X event storage policy.

BRIEF DESCRIPTION OF THE DRAWINGS

FIG. 2 is a diagram of the information lifecycle management system architecture of the present invention;

FIGS. 3a and 3b show the host file system storage area network subsystem and information lifecycle management storage area network subsystem respectively; and FIG. 4 is a matrix table of the node connectivity of the information lifecycle management system for the present invention.

DETAILED DESCRIPTION OF THE PREFERRED EMBODIMENT(S)

Figure 1:
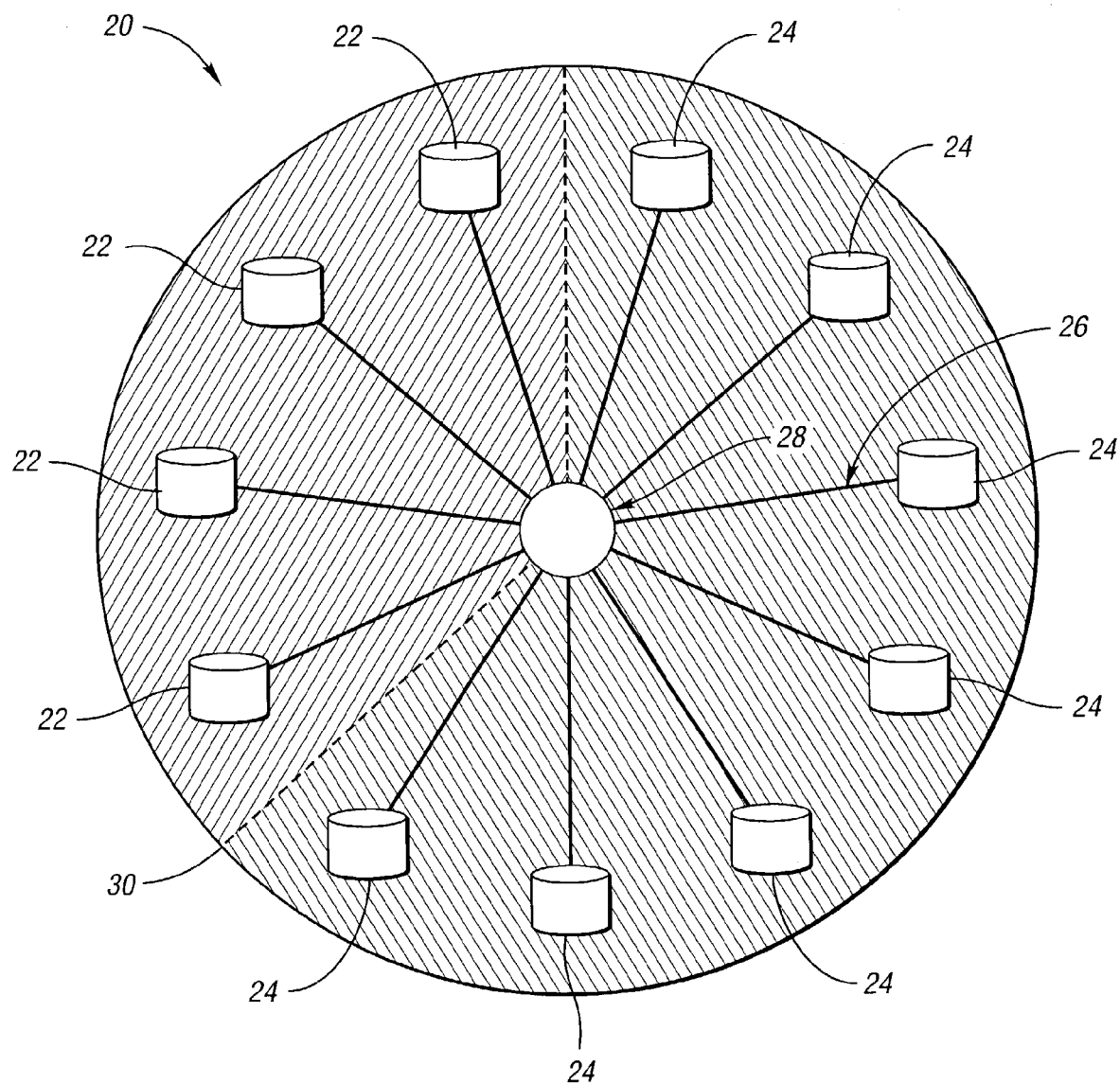
FIG. 1 is a star network topology of the present invention.

Now referring to the figures, FIG. 1 is a star network topology 20 of the present invention. The network nodes in the star network can be either host file system (HFS) storage area network (SAN) subsystem nodes 22 or information lifecycle management (ILM) SAN nodes 24. The term ILM subsystem may refer to either HFS SAN subsystem 22 or ILM SAN subsystem 24, which may be any StorageTek® subsystem with an embedded ILM Head. Each node 22,24 is an ILM subsystem outfitted with file transfer capabilities. Network link 26 in the star network topology supports bi-directional file transfers between any two nodes, ILM subsystems 22 and 24, on the network as specified by the storage resource manager (SRM) called the ILM Controller. The star hub is a high-bandwidth network switch called ILM Switch 28. Dotted line 30 clarifies the division between HFS SAN subsystem nodes 22 and ILM SAN subsystem nodes 24.

FIG. 2 is a diagram of the ILM system architecture of the present invention. The system architecture has two main elements: host file system (HFS) storage area network (SAN) 40 and information lifecycle management (ILM) SAN 42. Dotted line 30 clarifies the division between HFS SAN 40 and ILM SAN 42.

HFS SAN 40 is a traditional SAN model consisting of host computer 46 connected via switch 48 to one or more logical unit numbers (LUN) 50 on one or more HFS SAN subsystems 22. The switch 48 may be a fibre channel switch. Host computer 46 creates file systems on LUNs 50 for user file storage.

ILM SAN 42 consists of ILM switch 28 and ILM SAN subsystem 24. ILM SAN subsystem 24 is essentially a large, flat file system that serves as one-dimensional storage for migrated or replicated files. ILM SAN subsystem 24 may be a StorageTek® Virtual Storage Manager (VSM) 51.

ILM switch 28 is also connected to HFS SAN subsystem 22 via ILM data port 52. The network allows the file transfer between HFS SAN subsystem 22 and ILM SAN subsystem 24. HFS SAN subsystem 22 is connected to ILM SAN switch 28 through ILM Data Port 52. ILM Data Port 52 may be a fast Ethernet port and ILM switch 28 may be a network switch.

ILM Controller 54 communicates with ILM subsystems 22,24, host computers 46, ILM shim 47, and ILM database (DB) 56. ILM Heads 60 in the ILM subsystems 22,24 and ILM Controller may be peer nodes on the same transmission control protocol/internet protocol (TCP/IP) network 57. Control network 57 may be a separate TCP/IP based network that interconnects nodes of the ILM Heads 60 in ILM subsystems 22,24, ILM Controller 54, and ILM shims 47 installed on customer hosts 46. Control network 57 facilitates all file transfer operations between ILM subsystems 22,24 and provides a channel for transmitting and receiving file system metadata, file system event information, and network resource management orders. ILM Controller 54 directs all file transfers between any two ILM subsystems 22,24 for migration or replication based on user-specified data management policies. ILM control port 58 is operable for network communication with the ILM Controller 54.

FIGS. 3a and 3b show HFS SAN subsystem 22 and ILM SAN subsystem 24 respectively.

HFS SAN subsystem 22 consists of LUN port 50, ILM data port 52, ILM control port 58, ILM Head 60, and host file system 62. HFS SAN subsystem 22 may have a plurality of host file systems 62, and a plurality of LUN ports 50. HFS SAN subsystems 22 are connected to customer hosts 46 as a direct attach storage devices also called logical unit numbers (LUNs).

ILM SAN subsystem 24 consists of ILM Data Port 52, ILM Control Port 58, ILM Head 60, and ILM File System 66. However, unlike HFS SAN subsystems 22, ILM SAN subsystems 24 do not contain host LUNs 50. ILM SAN subsystems 24 are not mapped or mounted by customer hosts 46. Customer hosts 46 cannot directly access ILM SAN subsystems 24.

ILM Head 60 creates and maintains ILM file systems 66 of ILM SAN subsystem 24. ILM Head 60 transfers files to and from other ILM subsystems 22,24. ILM Head 60 can communicate commands, metadata, and status with other ILM subsystems 22, 24 and ILM Controller 54. ILM Head 60 may be Linux-based and may create a single Unix file system utilizing the entire subsystem capacity for the one-dimensional file store ILM file system 66. ILM Head 60 may use stock file transfer protocol (FTP) for file transfers between any ILM SAN subsystems 24. ILM Head 60 may use a modified FTP for file transfers involving HFS SAN subsystems 22.

ILM subsystems 22,24 exchange files through their respective ILM data port 52. ILM subsystem 22,24 can exchange files with any other ILM subsystem 22,24 through point-to-point file transfers.

The file transfers performed in the present invention are "hostless". ILM file transfers are conducted directly between ILM subsystems 22, 24, in a point-to-point fashion and without involving host computers 46. ILM Head 60 may be embedded in all storage products. The present invention governs the entire storage network by controlling operations, file system metadata, and file system events.

FIG. 4 is a matrix table of the node connectivity of the information lifecycle management system for the present invention. The matrix of the network star topology is combined with ILM Switch 28. The matrix table shows the interaction of HFS SAN subsystem nodes 22 and ILM SAN subsystem nodes 24. The combination forms a "grid" of storage devices as shown in the upper triangular (square) node connectivity matrix in FIG. 4. Each 'X' in the matrix denotes a bi-directional file transfer capability between an ILM subsystem 22,24 node pair. An 'X' along the diagonal indicates an intra node file transfer capability between host file systems 62 within an HFS SAN subsystem node 22. The diagonal entries for all ILM SAN subsystem nodes are blank because these subsystems consist of a single internal ILM file system 66, which rules out intra node transfers.

"Any-to-any" grid defines a network transport layer that is the basis for present invention. The basic unit of operation on this grid is the point-to-point reliable file transfer operation between any ILM subsystem 22,24 nodes, designated as source and sink nodes. The present invention uses FTP for reliable transfers instead of a network file system protocol. Network file system protocol is extremely inefficient with network bandwidth and less reliable than FTP. Also, network file system protocol poses a significant administrative burden compared to FTP.

ILM shim file system primitives and the ILM Head primitives together comprise an ILM Storage application programming interface (API) for ILM applications running on the ILM Controller 54 platform. The ILM Storage API provides methods for file system metadata services, file system event acquisition, point-to-point file transfers, and network resource management. ILM controller application programs use the Storage API to implement information lifecycle management and storage resource management policies.

The host software thin client is called an ILM Shim 47. The ILM shim 47 acquires file system metadata, acquires event information, and performs file system operations. ILM shim 47 provides a normalized access method for all user files, which allows the ILM Controller 54 to manage the universe of user files consistently, with a uniform syntax and rule set, regardless of the underlying HFS type. ILM controller 54 may supplement a storage operating system.

ILM file system shim 47 would be placed on host 46 to intercept essential file system primitives including, but not limited to: open( ), close( ), create( ), delete( ), and write( ). The shim would front-end the normal processing for these primitives and would also communicate with the ILM Controller 46. ILM shims 47 also serve file data-block number lists, lock/unlock/delete user files, and watch any file system events. Some platforms may support shims as loadable file system drivers. ILM shims on other platforms may require more direct methods of obtaining control, for example by redirecting the vectors for these primitives.

File system metadata services provide the basis for a universal access method for user files on HFS SAN subsystems 22, independent of the underlying file system format. For a given a hostname, LUN 50 and filename, the Storage API will contact the ILM Shim on this host 46 to obtain the logical block numbers comprising the given file on the specified LUN 50. When forwarded by ILM Controller 54 to ILM Head 60 on corresponding HFS SAN subsystem 22, this metadata can then be used as a virtual "file name" for point to point file transfer operations.

File system event acquisition services are used to monitor file system operations such as open, close, create, delete, read and write. Event driven ILM applications running on the ILM controller 54 can provide services such as file migration, hostless backup/restore and copy on write. Event acquisition services also provide a means for ILM applications to obtain file system reference strings via the ILM Shim. A reference string is collection of file system event descriptors concatenated in their natural order of occurrence.

In addition to the obvious online applications of a reference string, it is also possible to store reference strings for offline analysis, e.g., workload characterization, file reference pattern analysis (i.e., "working set" analysis) and file access trend analysis. The results of these analyses could serve as inputs to other ILM applications.

Point-to-point file transfer services allow applications to migrate, move, and replicate user files within the network of the present invention by directing the ILM Heads 60 on the source and sink subsystems, which may be ILM subsystems 22,24, to perform a file transfer operation.

Network resource management services provide a means for the present invention to control applications to manage the network elements. Examples may include storage provisioning, node maintenance, network expansion, and the like. The present invention supports "hostless" data migration ala traditional Hierarchical Storage Management (HSM), and hostless data replication in an off-line fashion, as opposed to online mirroring. The management of storage data is virtually "hostless", however the present invention may require minimal interaction with the host file system.

The present invention provides a system for a file to be replicated from one ILM subsystem 22,24 to another ILM subsystem. Replication is when an exact duplicate of the file is created, either in the same ILM subsystem 22,24 or a different ILM subsystem 22,24.

The present invention provides a system for the migration of a user data storage file from the HFS SAN 40 to ILM SAN subsystem 24. Migration is when a file is moved initially from HFS SAN 40 to ILM SAN subsystem 24. A representation of the user data storage file, acting as a placeholder, still exists in the host file system even though the data resides elsewhere. Migration may also occur within ILM SAN 42 in accordance with the storage policy. Files replicated on one or more ILM SAN subsystems 22,24 may also be migrated.

The migration of a user data storage file begins with customer host 46 creating a file in a local file system. The file system maps to a SCSI logical unit number (LUN) 50 on the source subsystem, which may be a StorageTek® Shared Virtual Array subsystem, within HFS SAN 40. The present invention then determines if the file is eligible for migration per storage policy. If the file not eligible, the migration process stops. If the file is eligible, ILM Controller 54 requests a list of data block numbers from the source file system ILM shim 47 installed on the customer host 46. ILM shim 47 then determines the ordered list of logical block numbers, which comprise the data blocks for the file to be migrated. ILM shim 47 then sends this list to ILM controller 54. ILM controller 54 selects the sink subsystem, which may be ILM SAN subsystem 22,24, to receive the migrated file. ILM controller 54 then sends a migration request to the ILM Head 60 on source ILM subsystem 22,24. The migration request specifies: the LUN 50 address of the source file system, the ordered block-number list for the file to be migrated, and sink ILM subsystem 22,24 address. ILM Head 60 opens ILM data port 52 connection to sink ILM subsystem 22,24 using FTP. ILM Head 60 then places a copy of the file on the sink device via FTP. FTP program is modified to accept an ordered list of logical block numbers as the source file name, and to retrieve these blocks from LUN 50. When transfer is complete, the ILM Head 60 closes ILM data port 52 connection and notifies ILM Controller 54 that the operation is complete. The user file migration process ends when ILM Controller 54 catalogs the status of this file as migrated in ILM DB 56 using an encoding scheme that uniquely identifies this particular file as having originated on a particular host LUN 50 and host file system 62.

During migration, the data blocks held by the file are not deleted on the source file system 62, in order to prevent an out-of-space condition from occurring during a recall operation. However, the present invention can delete these blocks and leave behind an empty placeholder file of the same name. ILM shims 47 can issue a message during recall if insufficient space exists in the sink file system. When a message issues for insufficient space in sink file system, the user or an administrator will have to clear some space in host file system 62 in order to recall the file.

The present invention provides a system for recalling a migrated user data storage file. The recall process begins when the host system opens a file. ILM shim 47 then intercepts the open call and forwards a synchronous open request to ILM Controller 54. ILM controller 54 determines if the file has been migrated. If the file is not migrated, the recall process then concludes when ILM Controller 54 notifies ILM shim 47 that the file can now be opened in the normal fashion. If the file is migrated, ILM Controller 54 recalls the file to the host file system 62 from source ILM subsystem 22,24. First, ILM Controller 54 accesses the ILM database 56 to determine where the file resides in ILM subsystem 22,24, the source subsystem. Next, ILM Controller 54 obtains from ILM shim 47 the ordered block-number list for the file to be recalled. This block number list comprises host file system 62 data block locations in the sink subsystem, HFS LUN 50. ILM Controller 54 directs source subsystem ILM Head 60 to transfer the file to the sink subsystem. This transfer process is similar to the migration process. The file transfer process uses a modified FTP process that accepts an ordered logical block-number list as a sink file name and stores the file content in these blocks. After the file transfer is complete, source subsystem ILM Head 60 deletes the file from ILM subsystem 22,24. After the file is deleted, ILM Head 60 notifies ILM Controller 54 that the recall is complete. The process ends when ILM Controller 54 deletes the migration notation for this file from ILM Database 56. ILM controller 54 then notifies the ILM shim 47 to resume the native open method.

In an alternative method to recall a migrated file, ILM shim 47 replaces the migrated file with an empty placeholder file. ILM Controller 54 asks ILM shim 47 to re-allocate the data blocks before the recall is performed. Reallocation may be performed by writing one byte in each block to be allocated. If ILM shim 47 cannot allocate enough data blocks to store the recalled file, ILM Controller 54 directs the shim to ask the user to clear some space in host file system 62 and try again.

The present invention also provides a system for the replication of a user data storage file. Storage policy specifications may direct ILM Controller 54 to replicate a user file on a host file system 62 that is mapped to a different HFS SAN subsystem 22, where both the source and sink devices are HFS SAN subsystems. The replication process has elements in common with the migration and recall methods described above.

ILM Controller 54 selects sink HFS SAN subsystem 22 and LUN 50 in accordance with storage policy. ILM Controller 54 then directs sink file system ILM shim 47 to allocate sufficient space, if possible, to receive the replicated file, and obtains from ILM shim 47 the logical block-number set that will comprise the replica. ILM Controller 54 then consults source file system ILM shim 47 to acquire the block-number set comprising the source file. ILM Controller 54 then directs the source ILM Head 60 to transfer these blocks to sink HFS SAN subsystem 22. ILM controller 54 may use a modified FTP process that accepts ordered block-number lists as both the source and sink file names. The replication process terminates upon conclusion of the file transfer. The replica is stored in HFS SAN subsystem 22 and not in ILM SAN subsystem 24. ILM Controller 54 does not catalog this replica in ILM DB 56.

The present invention also provides a method for replication of a migrated file, where a migrated file is replicated on a different ILM SAN subsystem 24. This is where both the source and sink devices are ILM SAN subsystems 24. The file transfer between ILM SAN subsystems 24 uses a stock FTP process since the source and sink files can be referred to by name. Also, it is not necessary to allocate space for the replica in advance of the transfer, but it is necessary to ensure the transfer completes successfully. ILM Controller 54 then catalogues the replica in ILM DB 56. The replica is not stored in HFS SAN 40. The replica is purely an ILM object, and is it not directly accessible from any host system.

The present invention also provides a method for migration of a migrated file. Migrated file migration is similar to the process for replication of a migrated file, however, the file is moved rather than replicated in accordance with storage policy. In a typical hierarchical storage management (HSM) progression, migrated files are in turn demoted to the next storage performance echelon, ILM subsystem 22,24. The next storage performance echelon is usually more cost-effective than the storage tier from which the file is being migrated.

The present invention also provides a method for moving a file from one host file system 62 to another host file system 62 mapped or mounted by the same host or a different host. Moving a file also means to relocate the file within HFS SAN 40 or within ILM SAN 42. The present invention provides a method for moving a file between ILM SAN subsystems 22,24.

The present invention also provides a method for promoting a migrated file from ILM SAN subsystem 24 to its host file system 62 of origin on HFS SAN subsystem 22. Promoted means the data associated with an HSM-migrated file is moved or recalled to host file system 62 where the data originated, whereupon the file is no longer considered migrated.

The present invention also provides additional administrative functions that enable the customer to manage ILM file system contents 62,66. Administration functions may include provision of additional storage, manual replication of files, movement of files and migration of files.

The present invention may also provide a method for offline replication of data files such as hostless backup and data duplication. Hostless backup intervals may be defined by storage policy. Replication capability may be invoked to copy a user file to an ILM subsystem 22,24. Additional storage policies can specify migration and deletion criteria for the backup copy.

The present invention also provides a "Copy-on-X" capability as defined by the user. The user file is replicated on ILM subsystem 22,24 in accordance with storage policy whenever the ILM Controller 54 detects a Copy-on-X event. ILM shim 47 notifies ILM Controller 54 of all copy-on-X event primitives. Primitives may include, but are not limited to: close( ), write( ) and delete( ). ILM controller 54 can manage the replication to HFS SAN subsystem 22 or ILM SAN subsystem 24, according to storage policy.

In a Copy-on-write event, the file is automatically replicated just before the first update is applied, providing a generational version control capability. In a copy-on-delete event, the file is automatically replicated just before it is deleted, providing data archival capability. During a copy-on-create event, the file is automatically replicated when it is closed upon creation, providing data protection capability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tiered information lifecycle management system comprising:
   a host file system (HFS) storage area network (SAN);
   an information lifecycle management (ILM) SAN connected to the HFS SAN;
   an ILM controller connected to the ILM SAN and the HFS SAN, wherein the ILM controller controls hostless data transfer between the HFS SAN and the ILM SAN, the ILM controller further controlling hostless data transfer within the HFS SAN, the ILM controller further controlling hostless data transfer within the ILM SAN, and the ILM controller further controlling hostless transfer of data between the HFS SAN and the ILM SAN for storage of the data in at least one of the HFS SAN and the ILM SAN in accordance with storage policies; and
   an ILM database (DB) connected to the ILM controller, wherein the ILM DB is operable with the ILM controller for tracking data storage information regarding the data stored in the HFS SAN and the ILM SAN.

2. The system of claim 1 wherein the HFS SAN comprises:
   a switch;
   a host computer connected to the switch and the ILM controller with a bi-directional communication network link; and
   an HFS SAN subsystem connected to the switch and the ILM controller with a network link, wherein the HFS SAN subsystem includes of a logical unit number (LUN) port, a host file system, and an ILM head having an ILM control port and an ILM data port.

3. The system of claim 2 wherein the switch is a fibre channel switch.

4. The system of claim 2 wherein the connection between the HFS SAN subsystem and the ILM controller is between the ILM control port of the ILM head of the HFS SAN subsystem and the ILM controller.

5. The system of claim 4 wherein the connection between the HFS SAN subsystem and the switch is between the LUN port of the HFS SAN subsystem and the switch.

6. The system of claim 2 wherein the ILM SAN comprises:
   an ILM switch connected to the ILM data port of the HFS SAN subsystem with a bi-directional communication network link; and
   an ILM SAN subsystem connected to the ILM switch with a bi-directional communication network link, wherein the ILM SAN subsystem includes an ILM file system and an ILM head having an ILM control port and an ILM data port.

7. The system of claim 6 wherein the connection between the ILM SAN subsystem and the ILM controller is between the ILM control port of the ILM SAN subsystem and the ILM controller.

8. The system of claim 7 wherein the connection between the ILM SAN subsystem and the ILM switch is between the ILM data port of the ILM SAN subsystem and the ILM switch.

9. The system of claim 2 wherein the host computer includes a plurality of host computers.

10. The system of claim 2 wherein the HFS SAN subsystem includes a plurality of HFS SAN subsystems.

11. The system of claim 6 wherein the ILM SAN subsystem includes a plurality of ILM SAN subsystems.

12. The system of claim 10 wherein the HFS SAN subsystem includes a plurality of host file systems.

13. The system of claim 6 wherein the host computer includes an ILM shim program, the ILM shim program being operable for monitoring all data storage activities in the HFS SAN; and
   the ILM shim program being operable for communicating with the ILM controller information regarding any data storage activity occurring in the HFS SAN.

14. The system of claim 13 wherein the ILM controller is operable with the ILM shim program for tracking the location of stored data on the HFS SAN subsystem which was written by the host computer.

15. The system of claim 14 wherein the ILM controller hostlessly transfers the stored data on the HFS SAN subsystem to the ILM SAN subsystem according to storage policies associated with the stored data.

16. The system of claim 15 wherein the ILM controller is operable with the ILM shim program for identifying a request by the host computer for the stored data from the HFS SAN subsystem, when in response to the request, the ILM controller hostlessly transfers the stored data from the ILM SAN subsystem to the HFS SAN subsystem for access by the host computer.

17. A tiered information lifecycle management system comprising:
   a host file system (HFS) storage area network (SAN) including a switch connected to a plurality of host computers and a plurality of HFS SAN subsystems;
   an information lifecycle management (ILM) SAN connected to the HFS SAN, the ILM SAN includes an ILM switch connected to the plurality of HFS SAN subsystems and a plurality of ILM SAN subsystems;
   an ILM controller connected to the plurality of host computers, the plurality of ILM SAN subsystems, and the plurality of HFS SAN subsystems, wherein the ILM controller controls hostless data transfer between the HFS SAN and the ILM SAN for data storage in accordance with a storage policy; and
   an ILM database (DB) connected to the ILM controller, wherein the ILM DB is operable with, the ILM controller for tracking information of storage files stored in the HFS SAN subsystems and the ILM SAN subsystems.

18. A tiered information lifecycle management system operable for hostless data transfer comprising:
   a host file system (HFS) storage area network (SAN) including a host computer with an information lifecycle management ILM shim program operable for monitoring data activities in the HFS SAN and a plurality of HFS SAN subsystems;
   an information lifecycle management (ILM) SAN connected to the HFS SAN, wherein the ILM SAN includes a plurality of ILM SAN subsystems;
   an ILM controller is connected to the ILM SAN and the HFS SAN, wherein the ILM controller controls hostless data transfer between the HFS SAN and the ILM SAN, the ILM controller further controlling hostless data transfer between the HFS SAN and the ILM SAN for data storage in accordance with storage policies when notified by the ILM shim program of data activities; and an ILM database (DB) connected to the ILM controller, wherein the ILM DB is operable with the ILM controller to catalog data storage information of data stored in the HFS SAN subsystems and the ILM SAN subsystems.

19. The system of claim 18, wherein the ILM controller recognizes a migration command for a data storage file based on a storage policy;

the ILM controller obtains information regarding stored location in a source HFS SAN subsystem of the data storage file from the ILM shim program;

the ILM controller selects a sink ILM SAN subsystem for the data storage file to be migrated according to the storage policy;

the source HFS SAN subsystem communicates the migration command with the sink ILM SAN subsystem;

the ILM controller commands the source HFS SAN subsystem to transfer the data storage file to be migrated to the sink ILM SAN subsystem;

the sink ILM SAN subsystem notifies the ILM controller of completed data storage file transfer; and the ILM DB stores information regarding the migration of the data storage file.

20. The system of claim 18, wherein the ILM controller recognizes a recall command for a data storage file from the ILM shim program based on a storage policy;

the ILM controller obtains information regarding stored location in either the plurality of HFS SAN subsystems or the plurality of ILM SAN subsystems of the data storage file from the ILM DB;

the ILM controller selects a sink HFS SAN subsystem for the data storage file to be recalled according to the storage policy;

either the HFS SAN subsystem or the ILM SAN subsystem, where the storage file to be recalled is stored, communicates the recall command with the sink HFS SAN subsystem;

the ILM controller commands either the HFS SAN subsystem or the ILM SAN subsystem, where the data storage file to be recalled is stored, to transfer the data storage file to be recalled to the sink HFS SAN subsystem;

an ILM control port of the sink HFS SAN subsystem notifies the ILM controller of completed data storage file transfer;

the ILM controller notifies the ILM shim that the storage data file transfer is complete and to proceed with the file recall; and the ILM shim notifies the host computer to access the recalled data storage file.

21. The system of claim 18, wherein the ILM controller recognizes a replication command for a data storage file based on a storage policy;

the ILM controller obtains information regarding the stored location in either the plurality of HFS SAN subsystems or the plurality of ILM SAN subsystems of the data storage file to be replicated from either the ILM shim or the ILM DB;

the ILM controller selects either a sink ILM SAN subsystem or a sink HFS SAN subsystem for the data storage file to be replicated according to the storage policy;

the ILM controller commands either the HFS SAN subsystem or the ILM SAN subsystem, where the data storage file to be replicated is stored, to copy the data storage file to be replicated to either the sink HFS SAN subsystem or the sink ILM SAN subsystem according to the storage policy;

either the sink HFS SAN subsystem or the sink ILM SAN subsystem notifies the ILM controller of a completed storage data file copy; and the ILM DB stores the information regarding the replication of the storage data file.

22. The system of claim 18, wherein the ILM controller recognizes a move command for a data storage file based on a storage policy;

the ILM controller obtains information regarding the stored location, in either the plurality of HFS SAN subsystems or the plurality of ILM SAN subsystems, of the data storage file to be moved from either the ILM DB or the ILM shim program based on the storage policy;

the ILM controller selects either a sink HFS SAN subsystem or a sink ILM SAN subsystem for the data storage file to be moved according to the storage policy;

the ILM controller commands either the HFS SAN subsystem or the ILM SAN subsystem, where the storage data file is stored, to transfer the data storage file to be moved to either the sink HFS SAN subsystem or the sink ILM SAN subsystem according to the storage policy;

either the sink HFS SAN subsystem or the sink ILM SAN subsystem notifies the ILM controller of completed data storage file move; and the ILM DB stores information regarding the movement of the data storage file.

23. The system of claim 18, wherein the ILM controller recognizes a promotion command for a data storage file from the ILM shim program of one of the plurality of host computers based on a storage policy;

the ILM controller obtains information regarding the stored location in the ILM SAN subsystem of the data storage file to be promoted from the ILM DB;

the ILM controller commands the ILM SAN subsystem, where the data storage file to be promoted is stored, to transfer the data storage file to the HFS SAN subsystem for the host computer based on the storage policy;

the ILM controller notifies the ILM shim program of completed promotion of the data storage file; and the ILM shim program notifies the host computer to access the promoted data storage file.

24. The system of claim 18, wherein the ILM controller performs a hostless back up of a storage data file in the plurality of HFS SAN subsystems to the plurality of ILM SAN subsystems defined by a storage policy.

25. The system of claim 18, wherein the ILM shim program recognizes a copy-on-X event command for a data storage file according to a copy-on-X event storage policy;

the ILM shim notifies the ILM controller of the copy-on-X event command for the data storage file; and the ILM controller copies the data storage file to the one of the plurality of HFS SAN subsystems or one of the plurality of ILM SAN subsystems according to the copy-on-X event storage policy.

* * * * *